(12) United States Patent
Inoue et al.

(10) Patent No.: US 9,593,720 B2
(45) Date of Patent: Mar. 14, 2017

(54) MOTOR

(71) Applicants: ASMO CO., LTD., Shizuoka-ken (JP); DENSO CORPORATION, Aichi-ken (JP)

(72) Inventors: Yoshiyasu Inoue, Kosai (JP); Nobuhiro Matsumoto, Kosai (JP); Masanori Ozaki, Kosai (JP); Hirokazu Tajima, Toyohashi (JP); Masaru Irie, Shizuoka (JP); Taei Sugiura, Anjo (JP)

(73) Assignees: ASMO CO., LTD., Shizuoka-ken (JP); Denso Corporation, Aichi-ken (JP)

( * ) Notice: Subject to any disclaimer, the term of this patent is extended or adjusted under 35 U.S.C. 154(b) by 222 days.

(21) Appl. No.: 14/640,443

(22) Filed: Mar. 6, 2015

(65) Prior Publication Data

US 2015/0252853 A1 Sep. 10, 2015

(30) Foreign Application Priority Data

Mar. 10, 2014 (JP) ................. 2014-046561
Feb. 3, 2015 (JP) ................. 2015-019462

(51) Int. Cl.
| F01L 1/34 | (2006.01) |
| F16D 3/10 | (2006.01) |
| F01L 1/344 | (2006.01) |
| F16D 3/26 | (2006.01) |
| F01L 13/00 | (2006.01) |

(52) U.S. Cl.
CPC ............... *F16D 3/10* (2013.01); *F01L 1/344* (2013.01); *F16D 3/26* (2013.01); *F01L 2013/103* (2013.01)

(58) Field of Classification Search
CPC ....... F01L 1/344; F01L 2013/103; F16D 3/10; F16D 3/26
USPC ................. 123/90.11, 90.15, 90.17
See application file for complete search history.

(56) References Cited

U.S. PATENT DOCUMENTS 8,251,029 B2 * 8/2012 Kurisu .................... F01L 1/352
123/90.15

FOREIGN PATENT DOCUMENTS

JP 2008160964 7/2008

* cited by examiner

*Primary Examiner* — Ching Chang
(74) *Attorney, Agent, or Firm* — Patterson Thuente Pedersen, P.A.

(57) ABSTRACT

A motor includes a motor body, a pin, a core, and an input cam. The motor body includes a housing and an output shaft. The pin is arranged in the output shaft to extend in a direction orthogonal to a rotation axis of the output shaft. The core is pivotally supported by the pin and rotates coaxially with the output shaft. The input cam is annular and surrounds an outer circumference of the core. The input cam rotates integrally with the core. An end surface of the core closer to the housing includes a first deviated surface. The core includes an insertion portion into which the pin is inserted. When a center axis of the core is coaxial to the rotation axis of the output shaft, the first deviated surface is located at a position farther from the housing than the insertion portion.

7 Claims, 5 Drawing Sheets

MOTOR

BACKGROUND ART

The present invention relates to a motor for use with, for example, a valve timing adjusting device that adjusts the valve timing in an internal combustion engine.

Japanese Laid-Open Patent Publication No. 2008-160964 describes an example of such a conventional motor that includes a motor body, a pivot shaft, a core, and an input cam (driven rotary body). The motor body includes a housing and an output shaft projecting from the housing. The pivot shaft is arranged in the output shaft orthogonal to a rotation axis of the output shaft. The core is pivotally supported by the pivot shaft and coaxially rotated with the output shaft. The input cam is annular and surrounds an outer circumference of the core. The input cam rotates integrally with the core. The input cam forms a portion of a speed reduction mechanism of the valve timing adjusting device. The speed reduction mechanism is coupled to an engine valve camshaft. Thus, rotation of the output shaft of the motor body is transmitted from the core to the input cam of the speed reduction mechanism. The rotation is decelerated by the speed reduction mechanism and transmitted to the engine valve camshaft.

A motor such as that described above is installed near an engine. Thus, the motor may be affected by engine vibration. This, for example, may incline and misalign the output shaft of the motor body and the input cam. In this regard, in the above motor, the core and the input cam pivot about the pivot shaft relative to the output shaft of the motor body. This allows the transmission of rotation even when the input cam is not coaxial to the output shaft.

Due to limitations in the available space, the above motor needs to be reduced in size in the axial direction (axial direction of the output shaft). However, the core is separated from the housing by a predetermined distance to ensure that a pivot angle is provided for the core. This increases the size of the motor in the axial direction. In this regard, there is room for improvement.

SUMMARY OF THE INVENTION

It is an object of the present invention to provide a motor that may be reduced in size in the axial direction while ensuring that a pivot angle is provided for a core.

To achieve the above object, one aspect of the present invention is a motor that includes a motor body, a pivot shaft, a core, and a driven rotary body. The motor body includes a housing and an output shaft that projects from the housing. The pivot shaft is arranged in the output shaft so that the pivot shaft extends in a direction orthogonal to a rotation axis of the output shaft. The core is pivotally supported by the pivot shaft and rotates coaxially with the output shaft. The driven rotary body is annular and surrounds an outer circumference of the core. The driven rotary body rotates integrally with the core. An end surface of the core closer to the housing includes a housing-side deviated surface. The core includes an insertion portion into which the pivot shaft is inserted. When a center axis of the core is coaxial to the rotation axis of the output shaft, the housing-side deviated surface is located at a position farther from the housing than the insertion portion.

To achieve the above object, another aspect of the present invention is a motor that includes a motor body, a pivot shaft, a core, and a driven rotary body. The motor body includes a housing and an output shaft that projects from the housing. The pivot shaft is arranged in the output shaft so that the pivot shaft extends in a direction orthogonal to a rotation axis of the output shaft. The core is pivotally supported by the pivot shaft and rotates coaxially with the output shaft. The driven rotary body is annular and surrounds an outer circumference of the core. The driven rotary body rotates integrally with the core. An end surface of the core closer to the housing is V-shaped or U-shaped to project toward the housing at a position corresponding to the pivot shaft as viewed in an axial direction of the pivot shaft.

BRIEF DESCRIPTION OF THE DRAWINGS

Novel features of the present disclosure will become apparent from the accompanying claims. The invention, together with objects and advantages thereof, may best be understood by reference to the following description of the presently preferred embodiments together with the accompanying drawings in which:

DETAILED DESCRIPTION OF THE PREFERRED EMBODIMENTS

One embodiment of a motor will now be described.

Figure 1A:
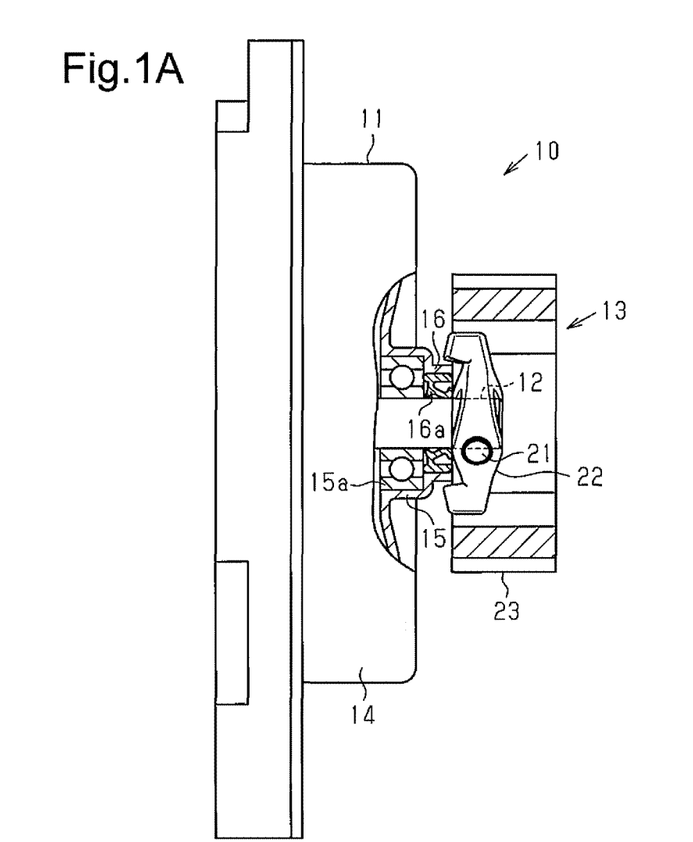
FIG. 1A is a schematic diagram of one embodiment of a motor according to the present invention.

As shown in FIG. 1A, a motor 10 of the embodiment is used for, for example, an electric valve timing adjusting device, which adjusts the valve timing of an internal combustion engine. The motor 10 includes a motor body 11, which functions as a drive source, and a speed reduction mechanism (not shown). The speed reduction mechanism is coupled to an output shaft 12 of the motor body 11 by a joint 13. The speed reduction mechanism is coupled to a camshaft (not shown) for an engine valve. Rotation of the output shaft 12 of the motor body 11 is transmitted to the speed reduction mechanism through the joint 13. Then, the rotation is decelerated by the speed reduction mechanism and transmitted to the camshaft.

The motor body 11 includes a housing 14. The housing 14 includes a bearing receptacle 15 that accommodates a bearing 15a (e.g., ball bearing). The bearing 15a axially supports the output shaft 12. The bearing receptacle 15 projects from a body of the housing 14. The housing 14 includes an annular seal receptacle 16 extending toward an axially outer side from the bearing receptacle 15. Hereafter, the "axial direction" refers to the axial direction of the output shaft 12 unless otherwise specified. The axial direction of the output shaft 12 conforms to an axial direction of the motor 10. The seal receptacle 16 accommodates an oil seal 16a that seals an opening of the seal receptacle 16. The output shaft 12, which projects from the seal receptacle 16, rotates when the motor body 11 is energized.

Joint Structure

Figure 1B:
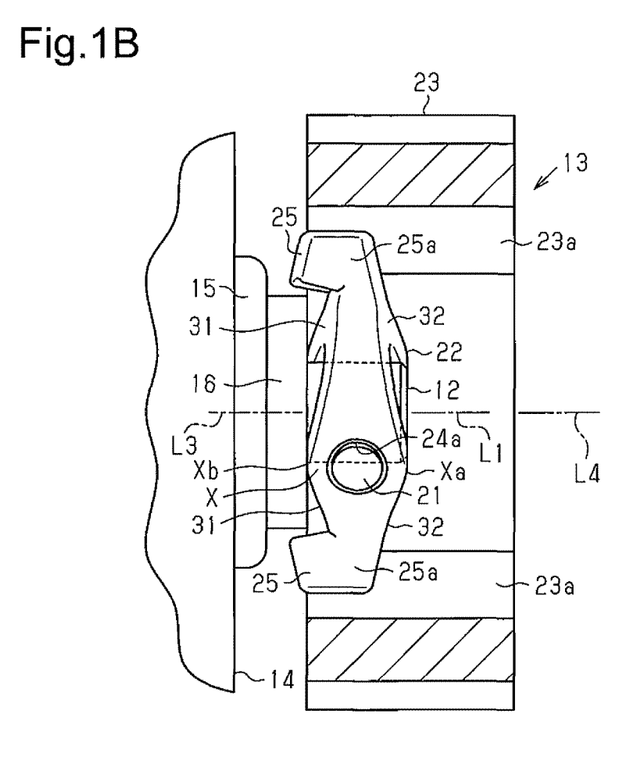
FIG. 1B is an enlarged schematic diagram of a joint of FIG. 1A.

The joint 13 includes a pin 21 functioning as a pivot shaft, a core 22, and an input cam 23 (driven rotary body). The input cam 23 forms a portion (input end) of the speed reduction mechanism.

Figure 2:
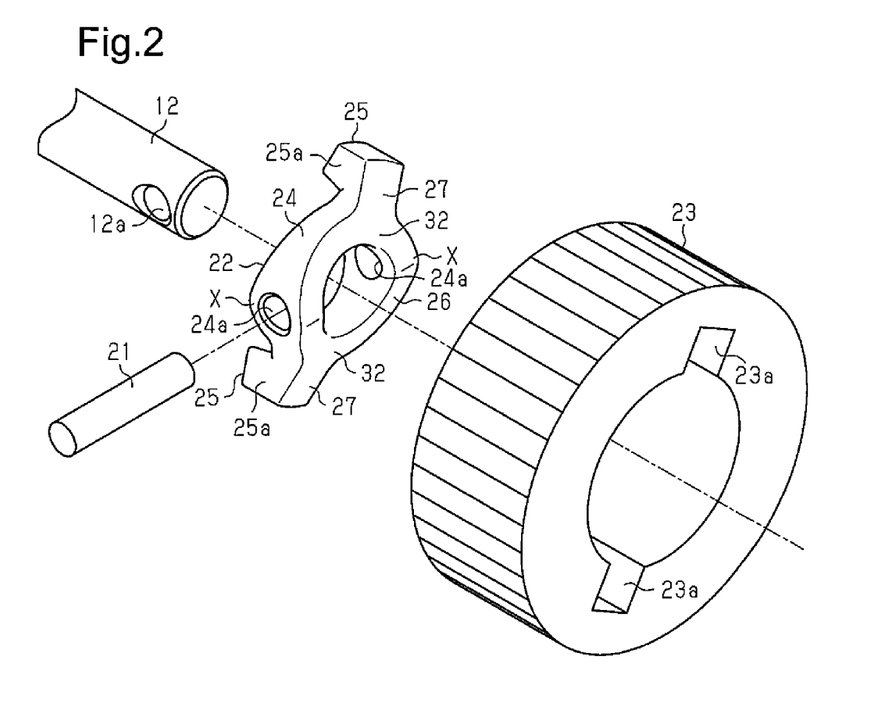
FIG. 2 is an exploded perspective view of the joint of FIG. 1B.
Figure 3:
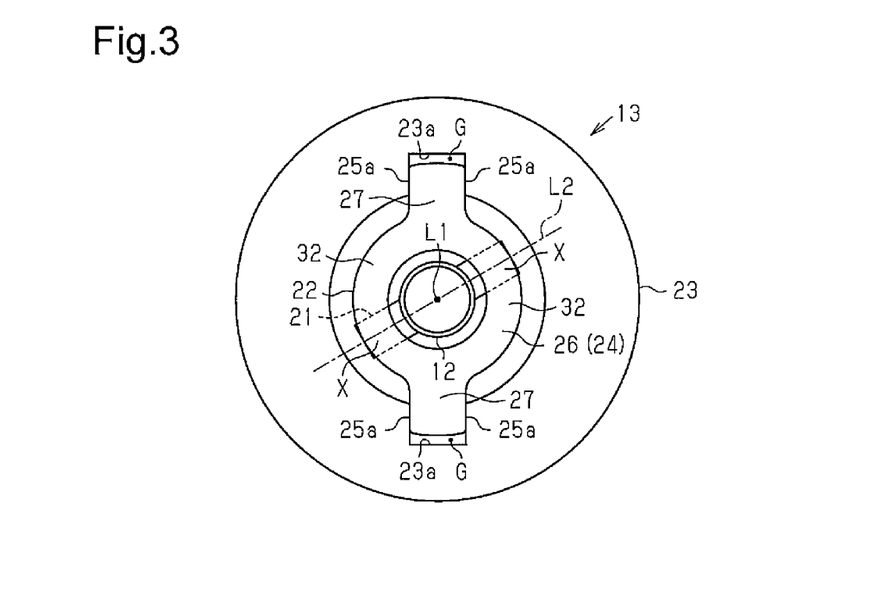
FIG. 3 is a schematic diagram of the joint of FIG. 2 as viewed in the axial direction.

As shown in FIGS. 1B, 2, and 3, the pin 21, which is rod-shaped, is press-fitted (interference-fitted) into a through hole 12a formed in a distal portion of the output shaft 12 projecting from the seal receptacle 16 of the housing 14. The pin 21 is coupled to the output shaft 12 so that the center axis L2 (refer to FIG. 3) of the pin 21 is orthogonal to the rotation axis L1 of the output shaft 12. The pin 21 has two longitudinal ends, each projecting from the through hole 12a. The pin 21 supports the core 22 so that the core 22 is pivotal (inclinable).

As shown in FIGS. 2 and 3, the core 22 includes a base 24, which is thin in the direction of the axis L3 of the core 22, and two axially extended portions 25 extending from the base 24 in the axial direction.

The base 24 is formed by an annular portion 26, through which the distal portion of the output shaft 12 extends, and two arms 27 extending radially outward from the annular portion 26 in opposite directions. The inner diameter of the annular portion 26 is set to be greater than the outer diameter of the output shaft 12. This forms a clearance between the inner circumferential surface of the annular portion 26 and the outer circumferential surface of the output shaft 12 (refer to FIG. 3).

The annular portion 26 includes insertion holes 24a opposed to each other at locations separated by 180 degrees. The pin 21 is inserted (loose-fitted) into the insertion holes 24a. When inserted into the insertion holes 24a, the pin 21 pivotally supports the core 22. That is, the core 22 may pivot about the center axis L2 of the pin 21, which is orthogonal to the rotation axis L1 of the output shaft 12.

Additionally, the clearance is formed between the annular portion 26 and the output shaft 12 in the radial direction. This allows for movement of the core 22 relative to the pin 21 in the direction of the axis L2 (longitudinal direction) (refer to FIG. 4).

The axially extended portions 25 extend from one side of the arms 27 in the axial direction, respectively. Each axially extended portion 25 includes two opposing circumferential surfaces defining rotation transmission surfaces 25a. Each rotation transmission surface 25a extends straight and is generally orthogonal to the circumferential direction of the annular portion 26.

The input cam 23 is annular. The core 22 is arranged in the input cam 23. The inner circumferential surface of the input cam 23 includes two engagement grooves 23a opposed to each other at positions separated by 180 degrees. The engagement grooves 23a extend in the axial direction. The axially extended portions 25 of the core 22 are respectively engaged with the engagement grooves 23a. Each rotation transmission surface 25a of the axially extended portions 25 is in contact with a circumferentially inner surface of the engagement grooves 23a (planar contact). This allows the rotation of the core 22 to be transmitted to the input cam 23. Additionally, the outer circumference of the input cam 23 includes gear teeth. The gear teeth mesh with a gear (not shown) of the speed reduction mechanism.

As shown in FIG. 3, each engagement groove 23a includes a gap G at a radially outer side of the axially extended portion 25. This allows the core 22 to move, relative to the input cam 23, along the circumferentially inner surfaces of the engagement grooves 23a in a direction in which the gap G extends (vertical direction in FIG. 3). Hereafter, the direction in which the gap G extends is referred to as a "gap direction". Additionally, when the core 22 is in planar contact with the circumferentially inner surfaces of the engagement grooves 23a, the core 22 is inclinable relative to the input cam 23 (the axes L3, L4 are inclinable relative to each other) (refer to FIGS. 5A and 5B).

The pin 21 is configured so that the axis L2 inclines relative to the gap direction (direction in which the arms 27 extend) as viewed in the axial direction. That is, the direction in which the core 22 inclines relative to the input cam 23 when guided by the engagement grooves 23a is configured to differ from the direction in which the core 22 pivots about the pin 21 relative to the output shaft 12.

As shown in FIG. 1B, the base 24 of the core 22 is rhomboidal as viewed in the direction of the axis L2 of the pin 21. More specifically, the thickness of the base 24 in the direction of the axis L3 (thickness in the axial direction) is the greatest at an insertion portion X (part of the annular portion 26) where the pin 21 is inserted. The thickness of the base 24 in the direction of the axis L3 decreases as the distance from a pivot axis of the core 22 (axis L2 of the pin 21) increases. The thickness is the smallest at the arms 27. The axial thickness of the base 24 at the insertion portion X is set to ensure the strength of the insertion portion X.

More specifically, the end surface of the base 24 closer to the housing 14 includes two first deviated surfaces 31 (housing-side deviated surfaces). The two first deviated surfaces 31 are respectively formed at opposite sides of the insertion portion X, or locations closer to the arms 27. In the embodiment, each first deviated surface 31 extends straight and inclines relative to the center axis L3 of the core 22. When the core 22 is balanced, each first deviated surface 31 is located at a position farther from the housing 14 than the insertion portion X. "When the core 22 is balanced" refers to when the center axis L3 of the core 22 is coaxial to the rotation axis L1 of the output shaft 12. More specifically, when the core 22 is balanced, the first deviated surfaces 31 are each located farther from the housing 14 than the surface of the insertion portion X that is closer to the housing 14.

Also, the end surface of the base 24 farther from the housing 14 (end surface located at the opposite side of the first deviated surfaces 31) includes two second deviated surfaces 32. The second deviated surfaces 32 are symmetric to the first deviated surfaces 31. The second deviated surfaces 32 are respectively formed at opposite sides of the insertion portion X. Each second deviated surface 32 extends straight and inclines relative to the center axis L3 of the core 22. When the core 22 is balanced, the second deviated surfaces 32 are each deviated from an axial second end Xa of the insertion portion X, which is the end surface of the insertion portion X that is farther from the housing 14, toward a position closer to the first deviated surfaces 31. Additionally, the core 22 is coupled so that an axial first end Xb of the insertion portion X is proximate to (i.e., in contact with or spaced apart by a subtle gap from) the seal receptacle 16 of the housing 14.

The operation of the embodiment will now be described.

When the rotation of the output shaft 12 of the motor body 11 rotates the core 22, the rotation of the core 22 is transmitted from the rotation transmission surfaces 25a to the input cam 23. This rotates the input cam 23 around the axis L4. Then, the rotary force, which is decreased by the speed reduction mechanism including the input cam 23, rotates the engine valve camshaft.

The motor 10 is installed near the engine, where vibrations are constantly generated. Thus, the axes of the motor body 11 and the speed reduction mechanism may easily become misaligned (eccentric, inclined, or skewed).

Figure 4:
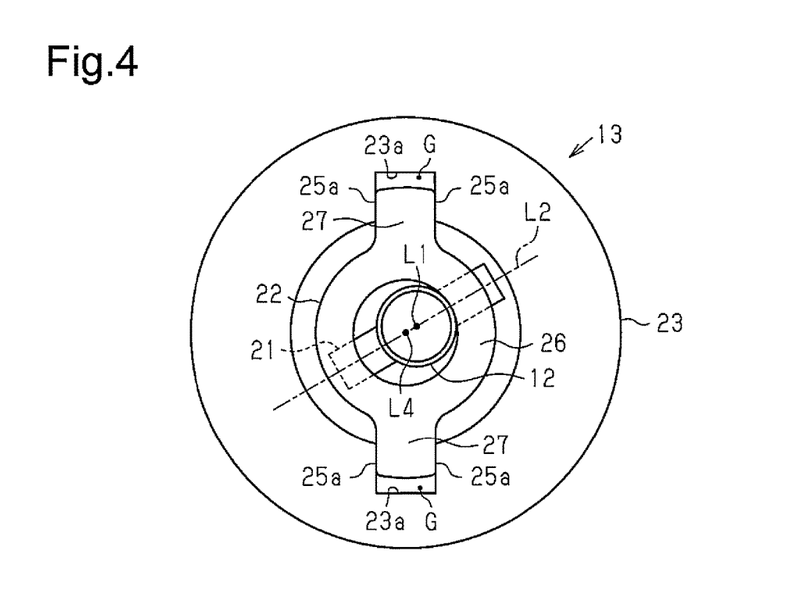
FIG. 4 is a schematic diagram illustrating the operation of the joint of FIG. 2.

In the motor 10 of the embodiment, the core 22 is movable relative to the output shaft 12 in the direction of the axis L2 of the pin 21. Thus, as shown in FIG. 4, the core 22 and the input cam 23 move integrally relative to the output shaft 12 in the direction of the axis L2. This results in the rotation axis of the speed reduction mechanism (center axis L4 of the input cam 23) being eccentric to the rotation axis L1 of the output shaft 12 (the two axes remain in parallel when separated). In this situation, the rotation transmission surfaces 25a of the core 22 are in contact with the engagement grooves 23a. Thus, the rotation of the core 22 is transmitted to the input cam 23.

Additionally, the gap G, which is radially formed between the core 22 and the input cam 23, allows the core 22 to move relative to the input cam 23 in the gap direction. This also results in the rotation axis of the speed reduction mechanism (center axis L4 of the input cam 23) being eccentric to the rotation axis L1 of the output shaft 12 in the radial gap direction. In such an eccentric state, the rotation of the core 22 is transmitted to the input cam 23.

Figure 5A:
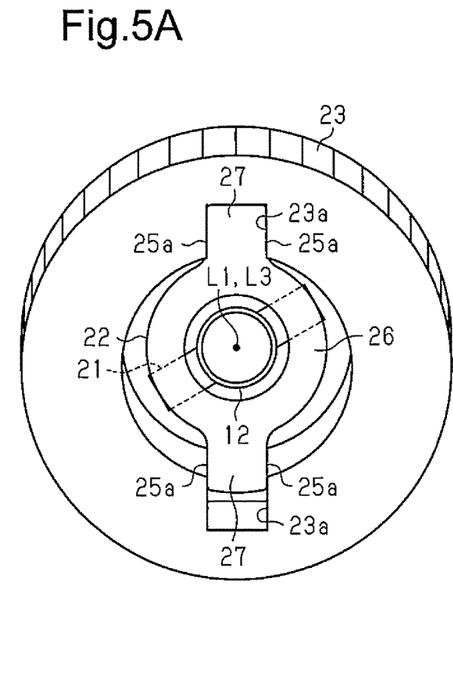
FIGS. 5A and 5B are schematic diagrams illustrating the operation of the joint of FIG. 2.
Figure 5B:
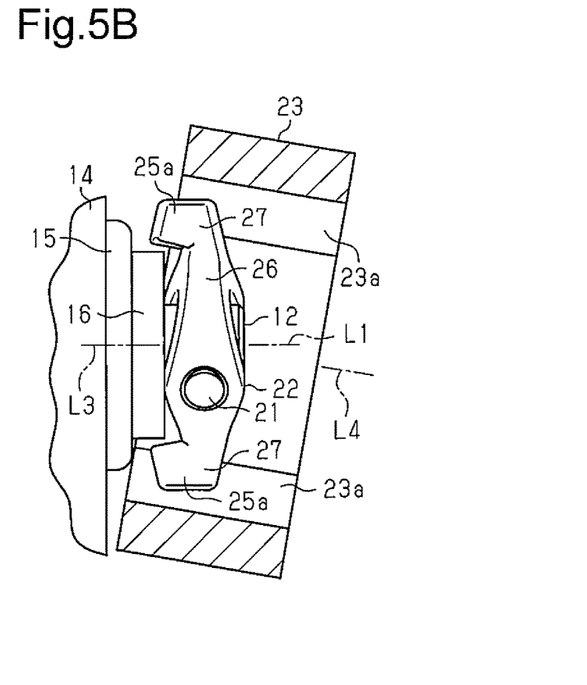

Additionally, as shown in FIGS. 5A and 5B, when the core 22 is in planar contact with the circumferentially inner surfaces of the engagement grooves 23a, the core 22 is inclinable relative to the input cam 23. In such an inclined state, the rotation transmission surfaces 25a of the core 22 are in contact with the engagement grooves 23a. Thus, the rotation of the core 22 is transmitted to the input cam 23.

Figure 6A:
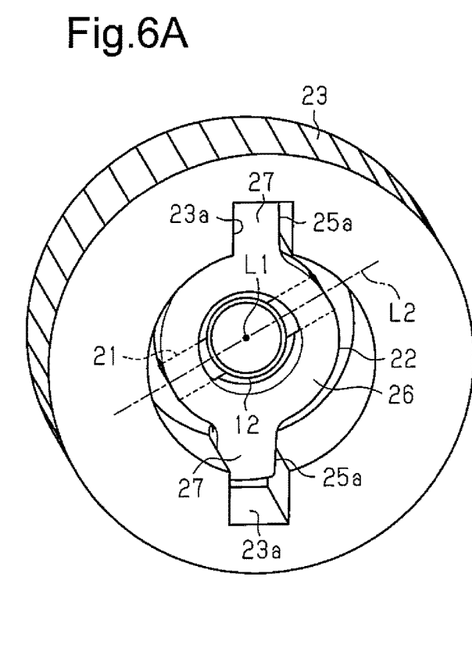
FIGS. 6A and 6B are schematic diagrams illustrating the operation of the joint of FIG. 2.
Figure 6B:
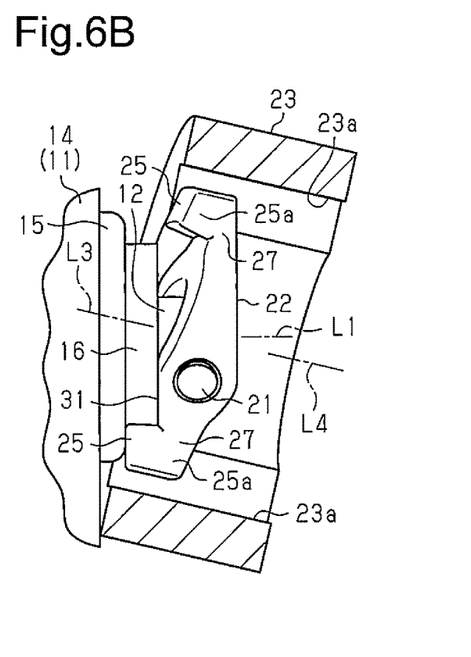

The core 22 is supported by the pin 21 and pivotal about the center axis L2. Thus, as shown in FIGS. 6A and 6B, the core 22 and the input cam 23 pivot (incline) integrally about the center axis L2 relative to the output shaft 12. Consequently, the rotation axis of the speed reduction mechanism (center axis L4 of the input cam 23) inclines relative to the rotation axis L1 of the output shaft 12. In such an inclined state, the rotation transmission surfaces 25a of the core 22 are in contact with the engagement grooves 23a. Thus, the rotation of the core 22 is transmitted to the input cam 23.

Figure 7A:
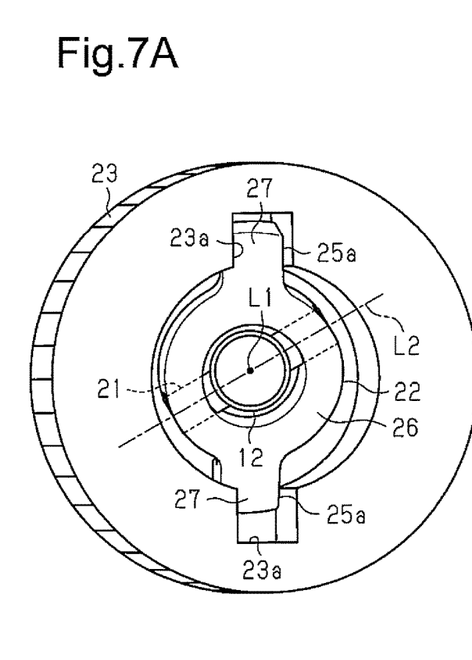
FIGS. 7A and 7B are schematic diagrams illustrating the operation of the joint of FIG. 2.
Figure 7B:
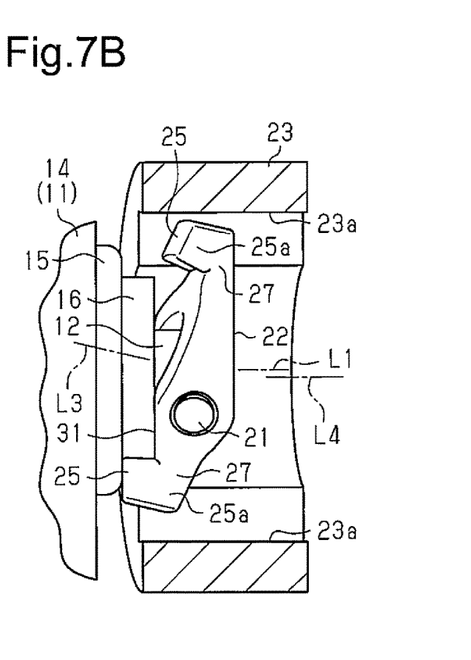

Further, as shown in FIGS. 7A and 7B, even when the core 22 pivots about the center axis L2 relative to the output shaft 12, the core 22 is inclinable relative to the input cam 23 along the circumferentially inner surfaces of the engagement grooves 23a. In this case, the axis L1 of the output shaft, the axis L3 of the core 22, and the axis L4 of the input cam 23 are not coaxial to one another. Thus, the movement of the core 22 may be a combination of the relative inclination about the axis L2 and the relative inclination along the circumferentially inner surfaces of the engagement grooves 23a of the input cam 23. Such a movement allows for axial misalignment of the input cam 23 relative to the output shaft 12. Even in such an axially misaligned state, the rotation of the core 22 is transmitted to the input cam 23.

As shown in FIG. 6B, the core 22 may pivot about the center axis L2 to where a first deviated surface 31 contacts a portion of the motor body 11 (in the embodiment, seal receptacle 16 of the housing 14). That is, when the first deviated surface 31 is in contact with the seal receptacle 16, the angle of the core 22 is the maximum pivot angle. In the embodiment, when the core 22 is at the maximum pivot angle, the first deviated surface 31 is in planar contact with an axially end surface of the seal receptacle 16. In this case, an inner surface of the axially extended portion 25 is in contact with the outer circumferential surface of the seal receptacle 16 in the radial direction.

As described above, even in a skewed state, in which eccentricity and inclination of the output shaft 12 and the speed reduction mechanism are combined, the rotation of the core 22 may be transmitted to the input cam 23.

The above structure of the joint 13 allows the rotation transmission from the motor body 11 to the speed reduction mechanism even when the axes of the motor body 11 and the speed reduction mechanism are misaligned.

The embodiment has the advantages described below.

(1) The end surface of the core 22 closer to the housing 14 includes the first deviated surfaces 31. When the core 22 is balanced, the first deviated surfaces 31 are located farther from the housing 14 than the insertion portion X. In this structure, even when the core 22 is located close to the housing 14 in the axial direction (axial direction of the output shaft 12), a gap may be ensured between the first deviated surfaces 31 and the housing 14. This reduces the size in the axial direction while ensuring that a pivot angle is provided for the core 22.

(2) The end surface of the core 22 at the opposite side of the first deviated surfaces 31 includes the second deviated surfaces 32. When the core 22 is balanced, the second deviated surfaces 32 are located closer to the first deviated surfaces 31 than the insertion portion X. In this structure, when the center axis L3 of the core 22 is inclined relative to the rotation axis L1 of the output shaft 12, the width of the core 22 is decreased in the direction of the axis L1. This allows for further reduction in the size of the motor 10 in the axial direction.

(3) When a first deviated surface 31 of the core 22 is in contact with a contact portion (seal receptacle 16) of the housing 14, a second deviated surface 32 extends straight in the direction orthogonal to the axial direction of the output shaft 12. In this structure, even when the core 22 inclines, the second deviated surfaces 32 are not located at an axially outer side of the insertion portion X. That is, the second deviated surfaces 32 are located farther from the housing 14 than the insertion portion X. For example, a component, such as a bolt for fastening the speed reduction mechanism, is located at an inner side of the input cam 23 at a position farther from the housing 14 than the core 22. In the above structure, even when such a component is located proximate to the core 22, interference of the component with the core 22 is limited. This allows for reduction in the axial size of the motor 10.

When coupled to the inner side of the input cam 23, the core 22 may be inclined relative to the output shaft 12 so a first deviated surface 31 contacts the seal receptacle 16. This stabilizes the position of the core 22. Additionally, in this case, the second deviated surface 32 is orthogonal to the axial direction of the output shaft 12. This allows the input cam 23 to be easily fitted to the core 22.

(4) When the core 22 is balanced, the first deviated surfaces 31 extend straight and incline relative to the rotation axis L1 of the output shaft 12. When the core 22 is inclined relative to the output shaft 12, a first deviated surface 31 is in planar contact with the seal receptacle 16. This allows the core 22 and the seal receptacle 16 to receive contact pressure from each other over a larger area.

(5) The core 22 is supported by the pin 21 and relatively movable in the axial direction of the pin 21. In this structure, when the core 22 moves relative to the output shaft 12 of the motor body 11 in the axial direction of the pin 21, the input cam 23 becomes eccentric to the output shaft 12. That is, the axes of the input cam 23 and the output shaft 12 remain in parallel when separated. The rotation transmission is allowed even when the input cam 23 is eccentric to the output shaft 12.

(6) The gap G radially extends between the core 22 and the input cam 23. The direction in which the gap G extends inclines relative to the direction of the axis L2 of the pin 21. In this structure, the gap G allows the core 22 to move relative to the input cam 23 in the radial direction. Thus, the rotation transmission is allowed even when the input cam 23 is eccentric to the output shaft 12. Additionally, the gap G allows the core 22 to incline relative to the input cam 23. Even in such an inclined state, the rotation transmission is allowed. The gap direction between the core 22 and the input cam 23 inclines relative to the axial direction of the pin 21 as viewed in the axial direction of the output shaft 12. Thus, the direction in which the gap G allows the core 22 to incline relative to the input cam 23 differs from the direction in which the core 22 pivots about the pin 21 relative to the output shaft 12.

(7) The base 24 of the core 22 includes an end surface located closer to the housing 14. The end surface is V-shaped and projected toward the housing 14 at a position corresponding to the pin 21 as viewed in the direction of the axis L2 of the pin 21 (direction of the pivot axis). Thus, even when the core 22 is located closer to the housing 14 in the axial direction (axial direction of the output shaft 12), the gap may be ensured between the core 22 and the housing 14. This reduces the size in the axial direction while ensuring the pivot angle is provided for the core 22.

The above embodiment may be modified as follows.

In the above embodiment, the first and the second deviated surfaces 31, 32 of the core 22 are straight. However, the first and the second deviated surfaces 31, 32 only need to extend into the core 22 from the insertion portion X in the direction of the axis L3. That is, the base 24 only needs to be configured so that a portion of the base 24 excluding the insertion portion X is thinner than the insertion portion X in the axial direction. The first and the second deviated surfaces 31, 32 may be, for example, stepped.

The end surface of the core 22 farther from the housing 14 does not necessarily have to include the second deviated surfaces 32. The end surface of the core 22 farther from the housing 14 may extend, for example, straight and be orthogonal to the axis L3 of the core 22. That is, the end surface of the core 22 farther from the housing 14 may include a surface that does not incline relative to the insertion portion X.

In the above embodiment, the present invention is applied to the motor 10, which is for an electric valve timing adjusting device. However, the present invention may be applied to a motor used for a different purpose.

Figure 8A:
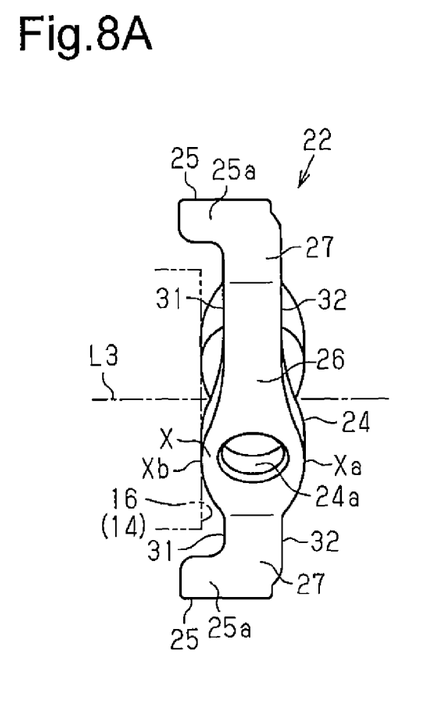
FIG. 8A is a side view of a further example of a core.
Figure 8B:
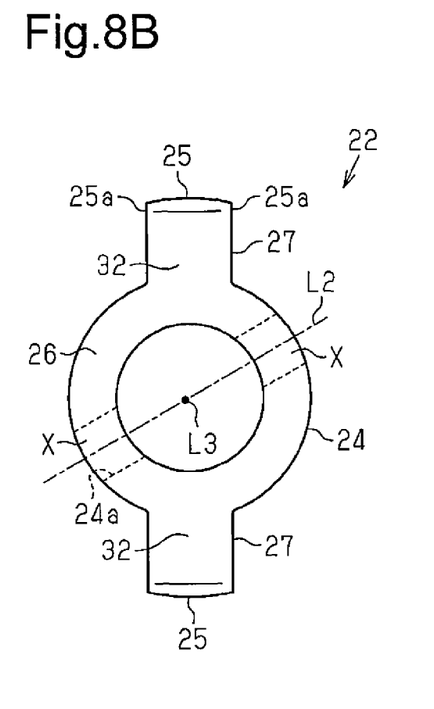
FIG. 8B is a plan view of the core shown in FIG. 8A.

The structure (e.g., shape) of the core 22 is not limited to that of the above embodiment and may be modified in accordance with the configuration. For example, in the above embodiment, the base 24 of the core 22 is rhomboidal in a side view, that is, the first and the second deviated surfaces 31, 32 of the base 24 are not parallel to each other (inclined relative to the center axis L3 of the core 22). Instead, as shown in FIGS. 8A and 8B, the first and the second deviated surfaces 31, 32 may be configured to be parallel to each other (orthogonal to the center axis L3 of the core 22). In the example shown in FIGS. 8A and 8B, the insertion portion X of the base 24 includes an end surface located closer to the housing 14. The end surface is U-shaped and projects toward the housing 14 in a side view. The end surface and the first deviated surfaces 31 are continuously formed. When the core 22 is balanced, the first deviated surfaces 31 are located at positions farther from the housing 14 than the axial first end Xb of the insertion portion X. Also, the second deviated surfaces 32 are located at positions closer to the first deviated surfaces 31 than the axial second end Xa of the insertion portion X. That is, the axial thickness of the base 24 of the core 22 shown in FIG. 8 is the greatest at the insertion portion X, into which the pin 21 is inserted. A portion of the base 24 excluding the insertion portion X has a constant thickness that is smaller than the thickness of the insertion portion X.

This structure obtains the operations and advantages that are the same as those of the above embodiment. In addition, in this structure, the first and the second deviated surfaces 31, 32 are parallel to each other. This ensures the pivot angle for the core 22 and the axial thickness of the base 24. In other words, this structure obtains an area in which the core 22 pivots to a position in which the first deviated surfaces 31 are in contact with the housing 14 (seal receptacle 16). This structure also ensures the axial thickness of a bent portion (basal portion of the axially extended portion 25) extending from the base 24 (arm 27) to the axially extended portion 25.

The invention claimed is:

1. A motor comprising:
a motor body that includes a housing and an output shaft that projects from the housing;
a pivot shaft arranged in the output shaft, wherein the pivot shaft extends in a direction orthogonal to a rotation axis of the output shaft;
a core pivotally supported by the pivot shaft, wherein the core rotates coaxially with the output shaft; and
an annular driven rotary body that surrounds an outer circumference of the core and rotates integrally with the core, wherein:
an end surface of the core closer to the housing includes a housing-side deviated surface;
the core includes an insertion portion into which the pivot shaft is inserted; and
when a center axis of the core is coaxial to the rotation axis of the output shaft, the housing-side deviated surface is located at a position farther from the housing than the insertion portion.

2. The motor according to claim 1, wherein:
the housing-side deviated surface is a first deviated surface;
an end surface of the core that is located at a side opposite to the first deviated surface includes a second deviated surface; and
when the center axis of the core is coaxial to the rotation axis of the output shaft, the second deviated surface is located at a position closer to the first deviated surface than an end surface of the insertion portion farther from the housing.

3. The motor according to claim 2, wherein when the first deviated surface is in contact with a contact portion of the housing, the second deviated surface extends straight in a direction orthogonal to an axial direction of the output shaft.

4. The motor according to claim 1, wherein:
when the center axis of the core is coaxial to the rotation axis of the output shaft, the housing-side deviated surface is configured to extend straight and incline relative to the rotation axis of the output shaft; and
when the core is inclined relative to the output shaft, the housing-side deviated surface is configured to be in planar contact with a contact portion of the housing.

5. The motor according to claim 1, wherein the core is supported by the pivot shaft so that the core is relatively movable in an axial direction of the pivot shaft.

6. The motor according to claim 1, wherein:
a gap between the core and the driven rotary body extends in a radial direction; and
an axial direction of the pivot shaft is inclined relative to the direction in which the gap extends.

7. A motor comprising:
a motor body that includes a housing and an output shaft that projects from the housing;
a pivot shaft arranged in the output shaft, wherein the pivot shaft extends in a direction orthogonal to a rotation axis of the output shaft;
a core pivotally supported by the pivot shaft, wherein the core rotates coaxially with the output shaft; and
an annular driven rotary body that surrounds an outer circumference of the core and rotates integrally with the core, wherein
an end surface of the core closer to the housing is V-shaped or U-shaped to project toward the housing at a position corresponding to the pivot shaft as viewed in an axial direction of the pivot shaft.

\* \* \* \* \*